United States Patent [19]  
Roth

[11] Patent Number: 4,751,153  
[45] Date of Patent: Jun. 14, 1988

[54] FRAME FOR A CELL CONSTRUCTION
[75] Inventor: Donald J. Roth, Westport, Conn.
[73] Assignee: Continental Can Company, Inc., Norwalk, Conn.
[21] Appl. No.: 73
[22] Filed: Jan. 2, 1987
[51] Int. Cl.⁴ .............................................. H01M 8/02
[52] U.S. Cl. ..................................... 429/35; 429/37; 204/253
[58] Field of Search ..................... 429/34, 35, 37, 38, 429/39; 204/252, 253, 282

[56] References Cited
U.S. PATENT DOCUMENTS

| | | | |
|---|---|---|---|
| 3,378,480 | 4/1968 | Reinshagen et al. | 204/253 |
| 4,175,025 | 11/1979 | Creamer et al. | 204/253 |
| 4,274,939 | 6/1981 | Bjareklint | 429/39 |
| 4,455,209 | 6/1984 | Hermann | 204/282 |

Primary Examiner—Donald L. Walton  
Attorney, Agent, or Firm—Charles E. Brown

[57] ABSTRACT

A frame and membrane assembly for a liquid transfer cell wherein the frame has a peripheral portion including opposite faces and one face is planar and the opposite face carries a peripherally outer sealing ring and inwardly thereof an anchoring arrangement for the membrane. Most specifically the anchoring arrangement is in the form of a peripheral groove of a generally dovetail cross section with an outer peripheral portion of the membrane being seated within that peripheral groove and retained therein in interlocked relation by way of a continuous second sealing ring. The second sealing ring, when the cell is assembled, is squeezed so as to both more tightly interlock the membrane with the frame and to form an inner seal between the two adjacent frames.

12 Claims, 1 Drawing Sheet

FRAME FOR A CELL CONSTRUCTION

This invention relates in general to new and useful improvements in cell constructions, and more particularly to a frame for a cell construction.

Cells of the type including a plurality of frames with membranes clamped between two adjacent frames are well known. However, difficulties have been experienced in effectively assembling such cells and more particularly the positioning and clamping of the membrane between the adjacent frames while maintaining a good seal between the adjacent frames.

In one type of cell construction, an effective seal has been obtained between adjacent frames by utilizing a compressible sealing ring. However, the membranes must also be clamped between two adjacent frames and in the past in order to accomplish this, one of each pair of opposing frame surfaces is provided with projections which generally bite into the membrane and force the membrane against the other frame surface. It has been found that this arrangement has not been satisfactory for the positioning of a membrane and maintaining such membrane in that position.

In accordance with this invention, one frame surface of each of a pair of opposing frame surfaces is provided with a generally dovetailed cross sectional groove and associated with that groove is a second sealing ring. Thus when the two frame surfaces are clamped together, the outer sealing ring forms a positive seal preventing escape of liquid from between the two frames while the inner resilient sealing member is deformed so as to stretch the membrane within the dovetailed cross sectional groove and positively maintain the membrane in position.

In addition, the second sealing ring also serves to aid in forming a seal against the escape of liquid from between the two frames.

With the above and other objects in view that will hereinafter appear, the nature of the invention will be more clearly understood by reference to the following detailed description, the appended claims, and the several views illustrated in the accompanying drawing.

Figure 1:
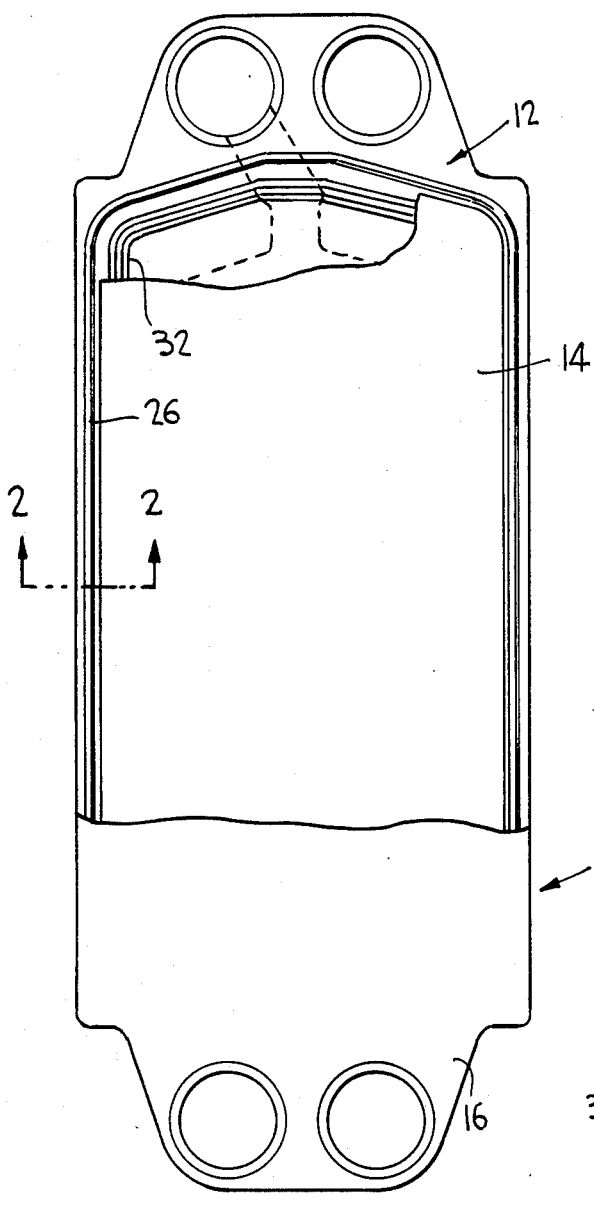
FIG. 1 is a prior art showing of a typical frame of an electrochemical cell between two of which a membrane is clamped in sealed relation.

Referring now to the drawings in detail, it will be seen that there is illustrated in FIG. 1 a known electrochemical cell generally identified by the numeral 10. The cell 10 is formed of a plurality of frames 12 with there being between adjacent frames 12 a membrane 14. Each cell 10 also includes an end plate 16. The end plate 16 and the frames 12 have conduit means therein for the inflow and outflow of liquids which are being treated. These, however, form no part of the invention.

Figure 2:
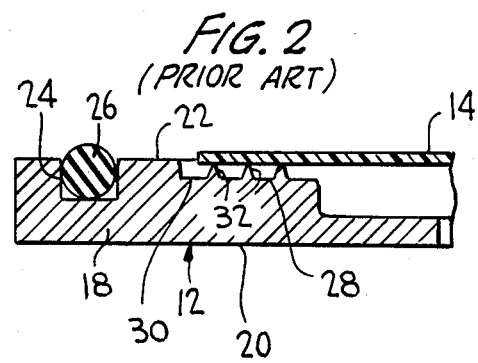
FIG. 2 is an enlarged fragmentary sectional view taken generally along the line 2—2 of FIG. 1 and it more specifically shows the prior art frame construction and the manner of positioning a membrane.

Referring now to FIG. 2, it will be seen that the known frame 12 has a peripheral joining portion 18 which includes a planar face 20 and a configurated face 22. The configurated face 22 includes a peripheral groove 24, which is rectangular in cross section. A resilient sealing ring 26 is seated in the groove 24 for engagement with the planar surface 20 of a next adjacent frame 12.

The face 22, within the periphery of the groove 24, is provided with means 28 for anchoring the membrane 14. These means include a recessed area 30 having projecting therefrom generally pointed upstanding ribs 32.

It will be readily apparent that there is nothing to hold the membrane 14 in position relative to a frame 12 during the assembly of the cell 10. Furthermore, there is a problem obtaining the proper membrane clamping pressure and the proper sealing pressure at the same time. It will be apparent that the resilient sealing ring 26 must project out of the groove 24 and be deformed by engagement by the surface 20 of the next adjacent frame 12. A certain pressure engagement is required to assure the seal.

On the other hand, it will be seen that the ribs 32 must project at least to the surface of the face 22 in order that the periphery of the membrane 14 may be clamped against the ribs 32 by the face 20 of the next adjacent frame. However, if the ribs 32 project too high improper engagement and deformation of the sealing ring 26 will occur. On the other hand, if the ribs 32 are not of sufficient height, when a good seal is made between two adjacent frames and the sealing ring 26, insufficient pressure engagement of the membrane 14 may occur to prevent displacement of the membrane within the completed cell.

Figure 3:
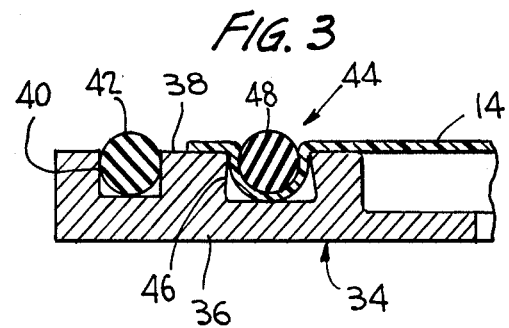
FIG. 3 is a sectional view similar to FIG. 2 and shows the frame and membrane retaining means which are the subject of this invention.

This invention relates to an arrangement which will provide positive anchoring of the membrane relative to the frame before the frame and membrane are assembled with others in the construction of the cell while at the same time providing for an assurance of a proper seal between adjacent frames and the proper clamping of the membrane in the constructed cell. Accordingly, there is provided a modified frame which is generally identified by the numeral 34. The frame 34, with the exception of the mounting of the membrane 14, will be identical to the frame 12. The underside of the frame 34, as viewed in FIG. 3, presents a planar face 36. The periphery of the frame 34 also has a face 38 which corresponds to the face 22 of the frame 12. The outer peripheral protion of the face 38 is provided with a groove 40 in which there is seated a resilient sealing ring 42. The purpose of the sealing ring 42 is to form a seal between the face 38 and a face 36 of a next adjacent frame 34.

In accordance with the invention, inwardly of the groove 40 are means for anchoring the membrane 14, the means being generally identified by the numeral 44. The anchoring means 44 includes a groove 46 in the face 38, the groove preferably being of a dovetailed cross section. Associated with the groove 46 is a second resilient sealing ring 48 which may be of a slightly smaller diameter than the sealing ring 42.

In forming the cell 10, each membrane 14 is anchored relative to its frame 34 by aligning the membrane 14 with the frame 34, and then inserting the sealing ring 48. The sealing ring 48, when installed in the manner shown in FIG. 3, sufficiently grips the membrane 14 to interlock the membrane 14 with the frame 34 and permits the handling of the assembled membrane and frame without displacement of the membrane.

After the required number of membranes and frames have been assembled, then the membrane-frame assemblies may be assembled to form the cell 10 without any worry of displacement of the membranes relative to the individual frames.

Figure 4:
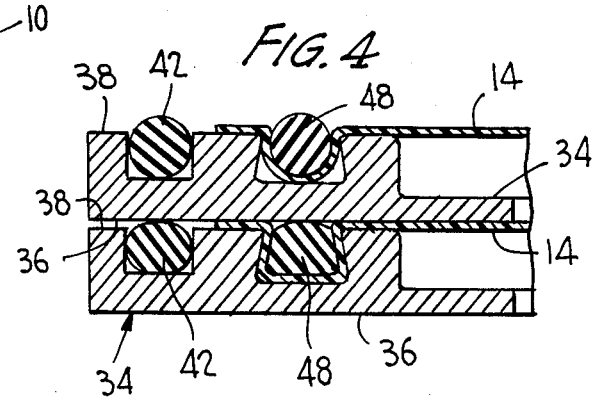
FIG. 4 is a sectional view similar to FIG. 3 showing two frames in clamped relation with respect to each other and to a membrane in accordance with the invention.

With reference to FIG. 4, it will be seen that when two frames 34 are assembled, the surface 36 of a next upper or adjacent frame 34 compressively engages the sealing rings 42 and 48. The sealing ring 42 forms an ultimate seal against the escape of liquid from between the two adjacent frames 34. The sealing ring 48 is further squeezed out within the groove 46 so as to more positively clamp the membrane 14 to its respective frame 44. At the same time, the sealing ring 48 forms a seal with the surface 36 of the next adjacent frame 34. Thus the sealing ring 48 serves the dual purpose of tightly clamping the membrane 14 to the frame 34 and forming an initial liquid tight seal between two adjacent frames 34.

Although only a preferred embodiment of the membrane and frame assembly has been specifically illustrated and described herein, it is to be understood that minor variations may be made therein without departing from the spirit and scope of the invention as defined by the appended claims.

I claim:

1. A frame for a cell construction wherein a membrane is clamped between two adjacent frames and a seal is effected between adjacent frames, said frame having opposite faces, a continuous peripheral groove in one of said faces, said groove being of an outline generally in accordance with but slightly smaller than the peripheral outline of an intended member, said groove being intended to receive an outer peripheral portion of a membrane and forming part of a membrane locking means, and a generally rope-like member for seating in said groove, said rope-like member being of a cross section to wedge a membrane portion in said groove and to project from said groove for compressive engagement by a next adjacent frame, and said rope-like member being formed of a resiliently deformable seal forming material whereby when two of said frames are clamped together said rope-like member will change in cross section to more tightly wedge a membrane in said groove and form a seal between the two adjacent frames with said rope-like member being disposed substantially entirely within said groove.

2. A frame according to claim 1 wherein said frame has a second peripheral groove in said one face disposed radially outwardly of both the first mentioned groove and the intended position of the outer periphery of an intended membrane, and a second generally rope-like member seated in said second groove, said second rope-like member also being formed of a resiliently deformable seal forming material and projecting out of said second groove for engagement in sealing relation with a next adjacent frame to form a secondary and final seal between adjacent frames.

3. A frame according to claim 2 wherein said rope-like members projecting generally equidistant from said one face.

4. A frame according to claim 2 wherein said rope-like members are initially in the form of O-rings.

5. A frame according to claim 1 wherein said groove increases in width within said frame with said increase in width forming means for facilitating said ropelike member being forced into said groove.

6. A frame and membrane assembly for a cell construction, said assembly comprising at least two frames having a membrane clamped therebetween, said frames having opposing faces, one of said opposing faces being planar and the other of said opposing faces having combined seal forming and membrane retaining means, said means comprising a peripheral groove, and an outer peripheral portion of said membrane being seated in said groove, and a generally rope-like member being seated in said groove outwardly of said membrane peripheral portion, said generally rope-like member being formed of a resiliently deformable seal forming material and being compressively engaged by said planar opposing face with said rope-like member being deformed and forced substantially entirely within said groove with said deformed rope-like member wedging said membrane within said groove to retain said membrane in said groove while forming a seal between said frames.

7. A frame and membrane assembly according to claim 6 wherein said other opposing face has therein a second peripheral groove disposed radially outwardly of the first mentioned groove, and a second generally rope-like member seated in said second groove, said second generally rope-like member also being formed of a resiliently deformable seal forming material and being compressively engaged by said planar opposing face to form a further seal between said opposing faces.

8. A frame and membrane assembly according to claim 7 wherein said generally rope-like members are in the form of O-rings.

9. A frame and membrane assembly according to claim 7 wherein said generally rope-like members are in the form of O-rings having an initial circular cross section.

10. A frame and membrane assembly according to claim 6 wherein said groove increases in width within said frame with said increase in width forming means for facilitating said rope-like member being forced into said groove.

11. A frame and membrane assembly for a cell, said assembly comprising a frame, a membrane and combined seal forming and membrane retaining means, said frame having a peripheral face, said membrane extending across said frame and having an outer peripheral portion overlying at least a portion of said peripheral face and said means comprising a peripheral groove, and an outer peripheral portion of said membrane being seated in said groove, and a generally rope-like member being seated in said groove outwardly of said membrane peripheral portion, said generally rope-like member being formed of a resiliently deformable seal forming material and resiliently retaining said membrane within said groove, said groove being of a cross section to substantially entirely receive said rope-like member.

12. A frame and membrane assembly according to claim 11 wherein said groove increases in width within said frame.

* * * * *